April 2, 1968  W. B. GIST, JR  3,375,997
COMPOUND AIRCRAFT AND PROPULSION SYSTEM
Filed June 10, 1966
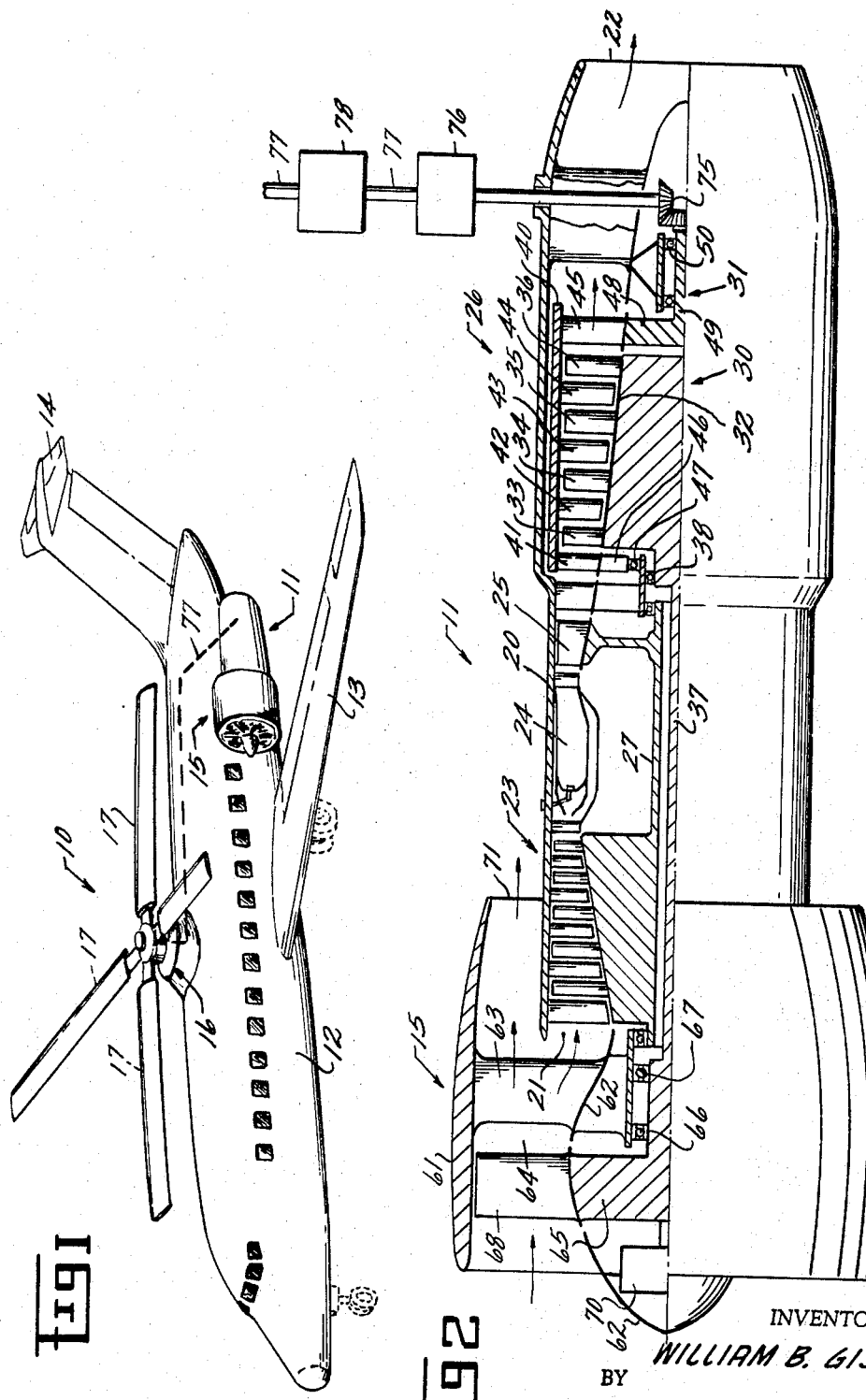
INVENTOR.
WILLIAM B. GIST, JR.
BY
George R. Powers
ATTORNEY United States Patent Office 3,375,997
Patented Apr. 2, 1968

3,375,997
COMPOUND AIRCRAFT AND
PROPULSION SYSTEM
William Bruce Gist, Jr., Lynnfield, Mass., assignor to
General Electric Company, a corporation of New
York
Filed June 10, 1966, Ser. No. 556,672
6 Claims. (Cl. 244—17.11)

ABSTRACT OF THE DISCLOSURE

A gas turbine powerplant having a pair of power turbine rotors each connected to an independent power output means. One of the power turbine rotors drives a horizontal thrust producing means, such as a bypass fan, and the other power turbine rotor drives a vertical thrust producing means, such as a helicopter rotor assembly. The power turbine rotors each have a plurality of axially spaced rows of turbine buckets, the rows of the first rotor being interdigitated with the rows of the rows of the second rotor causing the two rotors to rotate in opposite directions. Proportioning means control the relative amounts of power supplied to the horizontal and vertical thrust producing means. The proportioning means include braking means for controlling the rotation of at least one power turbine rotor.

---

This invention relates to a compound aircraft and propulsion system therefor and, more particularly, to an airframe and gas turbine powerplant arrangement in which the total power output of the powerplant may be divided between horizontal and vertical thrust producing devices.

The desirability of combining into a single aircraft the better features of conventional aircraft and vertical take-off and landing—VTOL—aircraft has been long recognized. Such an aircraft would be capable of rising vertically from an extremely small area, such as a heliport, and then converting at a suitable altitude to horizontal flight in the manner of conventional aircraft. After proceeding to its destination at relatively high speed, the aircraft would convert back to the vertical flight mode and descend vertically to a small landing space. Such compound or hybrid aircraft are, of course, particularly adapted for operations in areas devoid of conventional airfields. For example, this type of aircraft has particular utility for flights between the centers of congested urban areas, small landing areas in such metropolitan surroundings being economically feasible and greatly reducing the time generally spent by passengers in traveling to and from distant airports. Such aircraft are also suited for use in isolated and sparsely populated regions where the cost of constructing a conventional airfield would not be justified. Similarly, compound aircraft having vertical and horizontal flight capability have significant military advantages, a primary advantage being that such aircraft may take-off and land wherever needed, such as front line positions in combat zones.

It is an object of this invention to provide an improved compound aircraft and propulsion system therefor.

Another object of this invention is to provide a mechanically simple powerplant arrangement for propelling an aircraft in horizontal and vertical flight modes.

Still another object is to provide for compound aircraft a propulsion system which is both mechanically simple and relatively lightweight.

A further object of this invention is to provide for compound aircraft a propulsion system in which the total power output can be divided in desired proportions between horizontal and vertical thrust producing means.

A still further object is to provide a propulsion system capable of providing the foregoing objects while operating in a highly efficient manner.

Briefly stated, in carrying out the invention in one form, a gas turbine powerplant has a pair of power turbine rotors each connected to an independent power output means. More particularly, one of the power turbine rotors drives a horizontal thrust producing means, such as a bypass fan, and the other power turbine rotor drives a vertical thrust producing means, such as a helicopter rotor assembly. By a further aspect of the invention, proportioning means are provided for controlling the relative amounts of power supplied to each of the horizontal and vertical thrust producing means.

By still further aspects of the invention, the power turbine rotors each have a plurality of axially spaced rows of turbine buckets mounted thereon, the rows of the first rotor being interdigitated with the rows of the second rotor and the buckets being disposed to rotate the two rotors in opposite directions. The proportioning means for controlling the relative amounts of power supplied to the horizontal and vertical thrust producing means includes braking means for controlling rotation of at least one, and preferably both, of the power turbine rotors.

While the invention is distinctly claimed and particularly pointed out in the claims appended hereto, the invention, both as to organization and content, will be better understood and appreciated, along with other objects and features thereof, from the following detailed description when taken in conjunction with the drawing, in which:

FIG. 1 is a pictorial view of an aircraft having horizontal and vertical thrust producing means powered in accordance with the present invention; and FIG. 2 is a schematic cross-sectional illustration of one of the gas turbine powerplants of FIG. 1.

An aircraft indicated generally by the numeral 10 is illustrated by FIG. 1, a pair of gas turbine powerplants 11 (only one shown) being mounted on horizontally opposite sides of the fuselage 12 intermediate the wings 13 and the tail assembly 14. The gas turbine powerplants 11 form an integral portion of the propulsion system of this invention for propelling the aircraft 10 in both horizontal and vertical flight modes. More particularly, the gas turbine powerplants 11 each include a bypass fan portion 15 which, as described hereafter, may provide substantial forward or horizontal thrust. In addition, the gas turbine powerplants 11 include power turbine means for driving, in addition to the fan arrangement 15, a rotor assembly 16 having blades 17 whenever vertical thrust is desired. While the specific details of the powerplant arrangement of this invention will be described at a later point in this specification, it will now be obvious that, by suitably controlling the relative amounts of power supplied to the fan arrangement 15 and the rotor assembly 16, the aircraft 10 may be made to operate either as a conventional aircraft in which thrust is supplied solely by the fan arrangement 15 or as a vertical take-off and landing—VTOL—aircraft in which the entire power turbine output is supplied to the rotor assembly 16. By sharing the total available power between the fan arrangement 15 and the rotor assembly 16, the aircraft 10 may be made to operate as a short take-off and landing—STOL—aircraft. In the following description, the powerplant 11 along with the proportioning means for controlling the relative amounts of power supplied to the bypass fan 15 and the rotor assembly 16 will be described in detail.

With reference now to FIG. 2, one of the gas turbine powerplants 11 is illustrated in cross-section, the powerplant 11 including a primary cylindrical casing 20 having at opposite ends thereof an annular inlet 21 and an outlet 22. Within the casing 20 and forming therewith an annular motive fluid passage extending axially between the inlet 21 and the outlet 22 are a compressor 23, a combustor 24, a turbine 25, and a power turbine assembly 26. The compressor 23, the combustor 24, and the turbine 25 comprise a high energy gas producing means for supplying hot combustion gases to the turbine assembly 26, the turbine 25 rotatably driving the compressor 23 through a hollow shaft 27.

The power turbine assembly 26 is a contra-rotating arrangement having a first rotor 30 including a member 32 having a plurality of axially spaced, circumferential rows 33, 34, 35 and 36 of turbine buckets projecting radially outward therefrom across the motive fluid passage and a shaft 37 extending axially upstream from the member 32 through the interior of the gas generator shaft 27, the first rotor 30 being supported for rotation by the shaft 37 and a bearing assembly 38. The second rotor 31 includes a cylindrical support member 40 having a plurality of axially spaced rows 41, 42, 43, 44, and 45 of turbine buckets projecting radially inward therefrom in interdigitated relationship with the rows of buckets of the first turbine rotor 30. The radially inner ends of the turbine buckets of row 41 are interconnected by support structure 46 which is, in turn, rotatably mounted on a bearing 47. Similarly, the radially inner ends of the turbine buckets of row 45 are secured to a turbine disc 48 which is secured to a shaft 49 rotatably supported by a bearing 50.

The turbine buckets of the interdigitated rows are disposed to rotate the first power turbine rotor 30 and the second power turbine rotor 31 in opposite directions, the turbine buckets of the first rotor 30 thus acting relatively as stator vanes for the buckets of the second rotor 31, and vice versa. If both rotors 30 and 31 are free to rotate, the hot combustion gases passing over the turbine buckets will drive both turbine rotors and, hence, loads which may be connected to the power output shafts 37 and 49. If, however, either turbine rotor is held against rotation, the entire power output will be supplied through the other rotor and its associated shaft. The present invention utilizes this principle in a manner which will be hereinafter described.

Still referring to FIG. 2 the bypass fan arrangement 15 is located axially upstream of the inlet 21, the fan arrangement 15 comprising a cylindrical casing 61 coaxial with the casing 20 but of substantially greater diameter and an inner fairing 62 supported by struts 63 and forming with the casing 61 an annular flow passage 64. A fan rotor disc 65 is rotatably supported by bearings 66 and 67 and is driven by the shaft 37, the rotor disc 65 having a peripheral row of fan blades 68 mounted thereon. Braking apparatus 70 is located between the stator structure at the inner ends of the struts 63 and the shaft 37 for either permitting or preventing rotation of the rotor disc 65 and, of course, the first turbine rotor 30. If rotation of the rotor disc 65 is permitted, the fan blades 68 will compress ambient air flowing through the annular flow passage 64 a substantial amount of the compressed air being accelerated through an annular exhaust opening 71 formed between the casings 61 and 20 to produce forward thrust and the remainder being supplied through the inlet 21 to the compressor 22 of the gas generating means. If, however, rotation of the rotor disc 65 is prevented, ambient air flows through the passage 64 without being compressed and without producing horizontal thrust.

Turning attention now to FIGS. 1 and 2, the second power turbine rotor 31 of each powerplant 12 is connected through its power output shaft 49 and suitable gearing 75 to a gearbox 76, from which the rotor assembly 16 is driven through a suitable drive means 77. As in the case of the fan assembly 15, a braking device 78 is provided for either permitting or preventing rotation of the second power turbine 31 and the rotor assembly 16. If the rotor assembly 16 is driven by the second power turbine rotor 31, vertical lift forces or thrust is exerted on the aircraft 10 (assuming, of course that the blades 17 comprising the rotor assembly have the proper pitch). If, however, rotation of the rotor assembly 16 is prevented by the braking device 78, vertical thrust is not produced on the aircraft 10 and the entire power turbine output is supplied to the fan arrangement 15 through the power output shaft 37.

While it is believed to be obvious at this point, the mode of operation of the aircraft 10 will be described briefly. Assuming that a vertical take-off is desired, the brake 70 will be applied to prevent rotation of the first power turbine rotor 30 and the rotor disc 65 of the fan 15. Consequently, the entire power turbine output will be supplied to the second power turbine rotor 31 and the rotor assembly 16 to provide vertical lift, the brake 78 not being applied. As a result, the aircraft 10 will rise vertically. When a suitable altitude is reached, the brake 70 will be released so that both horizontal and vertical thrust will be produced, the aircraft 10 then beginning to move horizontally. When a horizontal speed sufficient for the wings 13 to provide adequate lift is reached, the brake 78 may be applied to prevent further rotation of the rotor assembly 26. At such a time, the aircraft 10 is propelled entirely by the fan arrangement 15 in the manner of conventional bypass engines, it being understood that some additional thrust would normally be provided by the exhaust products being discharged through the outlet 22. To convert from high speed flight to vertical flight for landing, the above described procedure is reversed.

It will, of course, occur to those skilled in the art that the entire sequence of operations described above need not be followed in all situations. For example, if a short take-off or landing, as opposed to a vertical take-off or landing, is desired, both brakes 70 and 78 may be released so that the power is split between the fan arrangement 15 and the rotor assembly 16. The same power split can be utilized whenever low speed flight is desired.

Furthermore, the brake 78 may be entirely disposed of if a relatively low speed aircraft is desired. If this is done, it may be desirable to reduce the size of the wings 13 since the rotor assembly 16 can be depended upon to provide substantial lift at all times.

From the foregoing, it will be appreciated that this invention provides an improved compound aircraft and propulsion system therefor in which the propulsion system is relatively simple and lightweight, not requiring auxiliary equipment such as supplementary turbines, ducts, valves, etc. The invention also provides a simple and reliable mechanism for dividing power between the horizontal and vertical thrust producing devices.

It will be understood that the invention is not limited to the specific details of the construction and arrangement of the particular embodiments illustrated and described herein. It is therefore intended to cover in the appended claims all such changes and modifications which may occur to those skilled in the art without departing from the true spirit and scope of the invention.

What is claimed as new and is desired to secure by Letters Patent of the United States is:

1. A compound gas turbine powerplant comprising:
   a cylindrical casing having an inlet and an outlet at opposite ends thereof,
   compressor means, combustion means, first turbine means for driving said compressor means, and second turbine means axially disposed within said casing and forming therewith a motive fluid passage extending axially between said inlet and said outlet,
   said second turbine means including a first power turbine rotor and a second power turbine rotor,
   and first and second power output means connected to said first and second power turbine rotors, respectively, for receiving power therefrom,
   said first power output means including fan means for accelerating a stream of ambient air to produce thrust, proportioning means for controlling the relative amount of power supplied to each of said first and second power output means, said proportioning means including braking means for controlling fan means whereby the accelerated stream of ambient air for producing horizontal thrust is capable of being varied.

2. A compound gas turbine powerplant as defined in claim 1 in which said braking means includes a first and second braking member, the first braking member being connected to said fan means to control the horizontal thrust and the second braking member being connected to said second power output means to control the vertical thrust.

3. A compound gas turbine powerplant as defined by claim 2 in which said fan means is located axially upstream of said inlet such that a first portion of the ambient air accelerated by said fan means is supplied to said inlet and a second portion of the ambient air is circumferentially bypassed about said casing.

4. A compound gas turbine powerplant as defined by claim 3 in which said second turbine means includes a first plurality of axially spaced rows of turbine buckets mounted on said first power turbine rotor and a second plurality of axially spaced rows of turbine buckets mounted on said second power turbine rotor, the rows of turbine buckets of said first power turbine rotor being interdigitated with the rows of turbine buckets of said second power turbine rotor and the turbine buckets being disposed to rotate said first and second power turbine rotors in opposite directions.

5. A compound gas turbine powerplant as defined by claim 4 in which said second power turbine rotor includes a cylindrical member peripherally surrounding said first power turbine rotor in spaced relation thereto, said first plurality of turbine buckets extending radially outward from said first power turbine rotor and said second plurality of turbine buckets extending radially inward from said cylindrical member of said second power turbine rotor.

6. A compound gas turbine powerplant as defined by claim 5 in which said second power output means includes shaft output means adjacent said outlet for driving separate thrust producing means.

References Cited

UNITED STATES PATENTS

| 2,689,615 | 9/1954 | Fletcher | 170—135.71 XR |
| 2,702,985 | 3/1955 | Howell | 60—226 |
| 2,947,364 | 8/1060 | Haworth | 170—135.71 |
| 3,038,307 | 6/1962 | Oprecht | 253—16.5 XR |
| 3,236,311 | 2/1966 | Quinn | 170—135.74 |

FOREIGN PATENTS 838,602   6/1960   Great Britain.

MILTON BUCHLER, *Primary Examiner.*

FERGUS S. MIDDLETON, *Examiner.*

P. E. SAUBERER, *Assistant Examiner.*